Nov. 27, 1951         H. C. WILSON              2,576,376
          DRILLING BIT FOR WOOD, OR THE LIKE
                  Filed Dec. 11, 1946
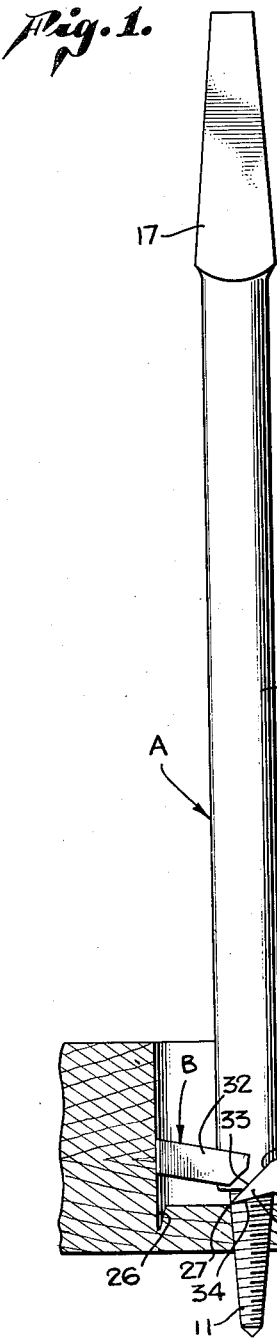
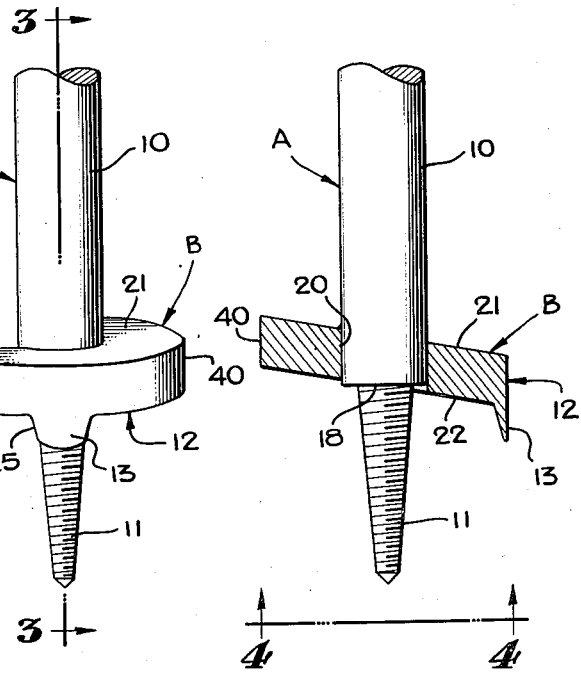
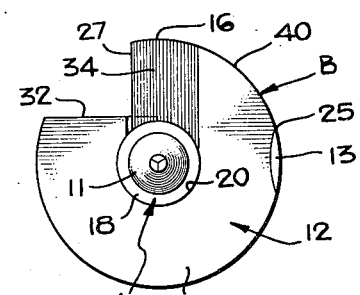
INVENTOR
Harry C. Wilson
BY
ATTORNEY Patented Nov. 27, 1951

2,576,376

UNITED STATES PATENT OFFICE 2,576,376

DRILLING BIT FOR WOOD OR THE LIKE

Harry C. Wilson, Sherman Oaks, Calif., assignor to Robert H. Clark, Los Angeles, Calif.

Application December 11, 1946, Serial No. 715,425

6 Claims. (Cl. 145—116)

This invention relates to a bit for wood or the like and it is a general object of the invention to provide a simplified, improved, practical tool of this character.

A general object of the present invention is to provide a bit effective for drilling holes in wood, or like materials, which bit is extremely simple in form and manufacture and is at the same time highly efficient and practical in operation. The structure that I have provided involves, essentially, two very simple inexpensive elements permanently joined into a rigid or integral unit.

It is a further object of the present invention to provide a bit of the general character referred to formed entirely of a shank having a feed screw formed on one end and a flat disc-like head fixed on the end of the shank adjacent the screw in a plane angularly related to a plane normal to the axis of the bit and having a depending lip at its lowermost portion making an annular cut in the material worked upon and having a cutting edge that effectively cuts or shaves the material within said cut.

A further object of the present invention is to provide a bit of the general character referred to wherein the blade or cutter head is of such character as to be practically stamped of sheet material to have a peripheral surface concentric with the shaft and parallel thereto to effectively guide the tool in the bore.

The various objects and features of my invention will be fully understood from the following detailed description of a typical preferred form and application of the invention, throughout which description reference is made to the accompanying drawings, in which:

Fig. 1 is a side elevation of the bit that I have provided showing it applied to work to illustrate the manner in which the tool operates. Fig. 2 is an enlarged detailed side view of the bit being a view taken substantially as indicated by line 2—2 on Fig. 1. Fig. 3 is a sectional view of the bit being a view taken as indicated by line 3—3 on Fig. 2 and Fig. 4 is a bottom end view of the bit being a view taken as indicated by line 4—4 on Fig. 3.

The tool that I have provided involves, generally, two elements joined into a permanent integral or rigid structure. One element A involves, generally, a shank 10 and a feed screw 11 on the outer or forward end of the shank while the other element B involves a simple disc-like part 12 fixed on the lower end portion of the shank 10 to have a depending lip 13 and a forwardly facing cutter blade 16.

The element A is preferably initially formed of a single body or bar of material and in its preferred form the shank 10 is a straight elongate part round in cross section. The shank may be provided at its upper or inner end with an upset or polygonal portion 17 to be received in the chuck of a suitable operating tool.

The feed screw 11 is provided on and projects downwardly from the lower end 18 of the shank and is preferably a downwardly converging or tapered threaded part somewhat smaller in diameter than the shank. In practice I prefer to proportion the screw 11 so that it is large enough in diameter and is of sufficient extent axially of the tool to have effective feeding action or, in other words, an effective bite on the material being worked upon.

The head element B is preferably a flat disc-like part 12 characterized by its pitched or inclined position on the lower end portion of the shank while its lip 13 depends from its lowermost part while its cutting blade 16 is advanced around the head from its lowermost part to be in a most advantageous cutting position and so that it faces forward or in the direction of rotation of the tool. By inclining the head in the manner indicated the parts mentioned are properly related and the other parts of the head handle cuttings and in no way impair the action of the tool.

The head B is formed with a central opening 20 that receives the lower end portion of shank 10 and this opening is formed through the plate out of which the head is formed at an angle to the plane of the plate or, in other words, at an angle to the top and bottom faces 21 and 22. The lower end portion of the shank 10 fits snugly into the opening 20 in element B and because of the pitch or inclination of the opening 20 the head B is carried on the end of the shank 10 at an angle or so that it is inclined, as clearly shown in the drawings.

In accordance with my invention the head B is fixed or permanently joined to or on the lower end portion of shank 10 and although I may employ various fastening means such as soldering, brazing, welding, etc. I prefer that it be furnace brazed in the desired position.

The lip 13 of the head B depends from or projects downwardly from the lowermost edge portion of the head and has its leading or forward edge portion 25 sharpened so that it makes an annular groove or cut 26 in the material being worked upon.

The cutting blade 16 is provided on the disc-like head 12 to project somewhat downward from the bottom 22 of the disc and is disposed so that its leading or forward cutting edge 27 faces forward at a point somewhat below the lower end 18 of the shank. In the particular form of head illustrated the disc forming the head is cut away or notched at one side, the cut being made so that it has walls at right angles to each other, one forwardly facing wall 30 being continuous with the forward or upper side of the blade 16 and the other wall 32 being forward of the blade 16. The notch or cut made in the disc as shown in Fig. 4 is such as to leave ample clearance forward of the blade 16 to pass or accommodate cuttings made by the blade as the tool operates. The top face 33 of blade 16 is continuous with the wall 30 of the notch in the disc and it extends upwardly and rearwardly from the edge 27 as clearly shown in the drawings. The bottom face 34 of the blade extends rearwardly and somewhat upwardly from the edge 27 to provide clearance rearward of the cutting edge.

The outer or peripheral wall 40 of the head B is concentric with the opening 20 and therefore with the axis of the tool, and it is parallel with the opening 20 to be parallel with the longitudinal axis of the tool. The peripheral wall or surface 40 of the head B forms an effective guide or bearing for the tool in the bore or cut 50 made as the tool operates in a body of wood, or the like.

A feature of my invention is the formation of the head B as a disc-like part which is so simple that it can be readily stamped or punched from sheet material. The head involves the two cutting parts of the tool, that is, the lip 13 and the blade 16 and the formation of the head is such that the cutting edges are both accessible so they can be readily sharpened and they are shaped and located so that they are most effective in operation. The element A of the tool is a very simple, easily formed part and in assembling the elements A and B it is merely necessary to apply the pre-formed element B to the lower end portion of the shank 10 of element A and then make the elements secure so they do not become separated. As above described, it is advantageous in practice to furnace braze the element B on the element A.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A bit of the character described including two elements joined into a permanent unit, one element including a central elongate shank having a smooth lower end portion round in cross sectional configuration and having a feed screw projecting downward from its lower end portion, the other element including a substantially flat disc-like head fixed in an inclined position on the lower end portion of the shank adjacent the screw and having a peripheral cutting lip at its lowermost portion and having a blade with a cutting edge, the head having a smooth central bore receiving said end portion of the shank.

2. A bit of the character described including two elements joined into a permanent unit, one element including a central elongate shank having a feed screw projecting from its lower end, the other element including a substantially flat disc-like head of substantial thickness fixed in an inclined position on the end of the shank adjacent the screw and having a peripheral cutting lip depending from its lowermost portion and having a blade with a cutting edge, the peripheral edge surface of the head being concentric with the shank and parallel with the longitudinal axis of the shank forming a guide surface engaging the wall of a bore made by the bit.

3. A bit of the character described including two elements joined into a permanent unit, one element including an elongate shank having a feed screw projecting from one end, the other element including a substantially flat disc-like head fixed in an inclined position on the end of the shank adjacent the screw and having a cutting lip depending from the lowermost part of its periphery and having a blade with a cutting edge circumferentially spaced from the lip and located immediately forward of the lip and extending continuously the entire distance from the shank to the periphery of the head, the peripheral edge surface of the head being concentric with the shank and parallel with the longitudinal axis of the shank, and the cutting edge of the blade being on a plane normal to the central axis of the bit and intersecting the lowermost part of the head from which the lip depends.

4. A bit of the character described including, a central elongate shank with a smooth walled lower end portion, a feed screw integral with the shank and projecting from the lower end thereof, and a substantially flat disc-shaped head having an inclined central smooth walled opening receiving said lower end portion of the shank so the shank holds the head inclined relative to the shank, the outer periphery of the head being concentric and parallel with said opening and forming a centering guide for the bit, the head having a cutting lip depending from the lowermost portion of its periphery and having a blade forward of the lip.

5. A bit of the character described including, a central elongate shank, a feed screw integral with the shank and projecting from the lower end thereof, and a substantially flat disc-shaped head having an inclined central opening receiving the lower end portion of the shank so the shank holds the head inclined relative to the shank, the outer periphery of the head being concentric and parallel with said opening and forming a centering guide for the bit, the head having a cutting lip depending from the lowermost portion of its periphery and having a blade circumferentially spaced from the lip and located immediately forward of the lip and extending continuously the entire distance from the shank to the periphery of the head.

6. A bit of the character described including two elements joined into a complete permanent unit, one element having an elongate central shank with a smooth surfaced lower end portion round in cross sectional configuration and having a feed screw projecting downward from the said lower end portion, the other element being a substantially flat disc-shaped head of substantial thickness and having a central inclined smooth walled bore receiving said end portion of the shank, there being a cutting lip integral with and depending from the lowermost portion of the head, the head having a radial opening extending from said bore to the periphery of the head, one wall of the opening being sharpened to present a forwardly facing cutting edge immediately forward of the lip and in a plane normal to the central axis of the bit and intersecting the lowermost portion of the head from which the tip depends, the periphery of the head being a smooth guide part concentric with the shank and extending parallel therewith.

HARRY C. WILSON.

REFERENCES CITED

The following references are of record in the file of this patent:

UNITED STATES PATENTS

| Number | Name | Date |
| --- | --- | --- |
| 645,222 | Tuttle | Mar. 13, 1900 |
| 2,320,612 | Kandle | June 1, 1943 |

FOREIGN PATENTS

| Number | Country | Date |
| --- | --- | --- |
| 15,982 | Great Britain | July 10, 1911 |
| 202,791 | Great Britain | Aug. 30, 1923 |
| 328,153 | Great Britain | Apr. 24, 1930 |